May 27, 1969  H. O. W. WOITZEL  3,445,888
GRANULATING DEVICE
Filed Jan. 20, 1967
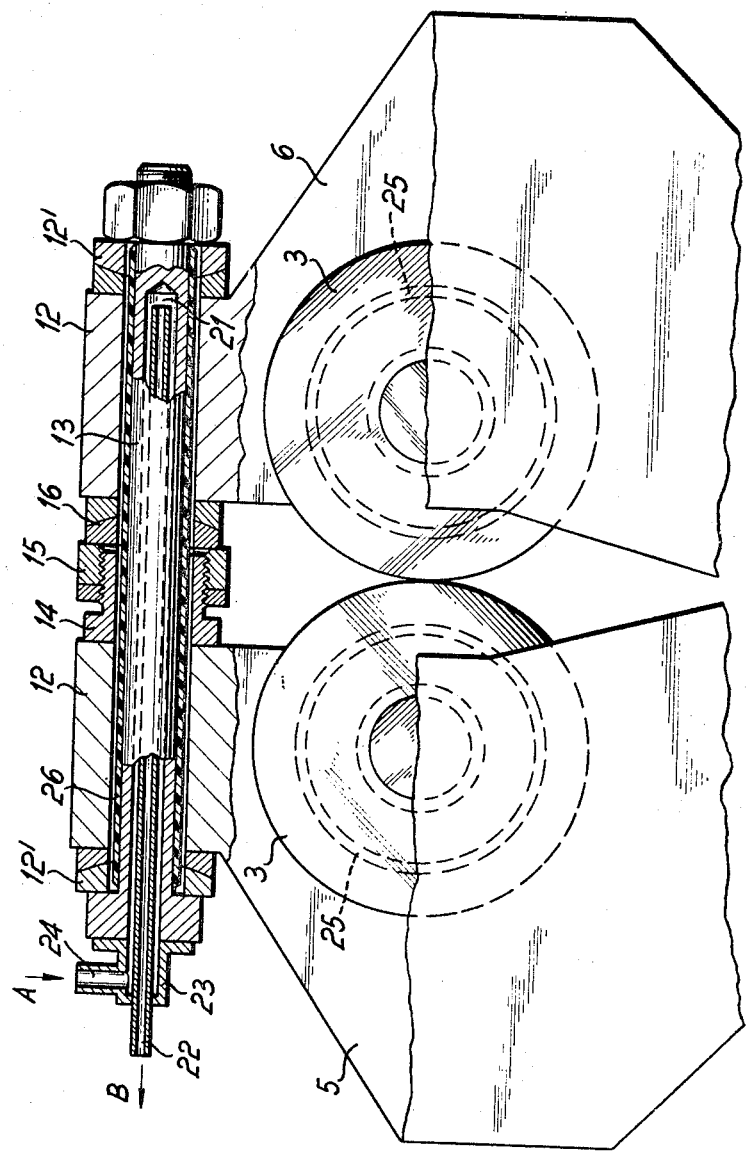
INVENTOR:
Heinz Otto Wilhelm WOITZEL
BY Haane and Rydick
ATTORNEYS United States Patent Office 3,445,888
Patented May 27, 1969

3,445,888
GRANULATING DEVICE
Heinz Otto Wilhelm Woitzel, Stuttgart-Feuerbach, Germany, assignor to Werner & Pfleiderer, Stuttgart-Feuerbach, Germany, a corporation
Filed Jan. 20, 1967, Ser. No. 610,653
Claims priority, application Germany, Jan. 21, 1966,
W 40,768
Int. Cl. B02c 4/02
U.S. Cl. 18—9                     7 Claims

ABSTRACT OF THE DISCLOSURE

The invention relates to a granulating device in which a pair of grooved rollers coact to granulate the material therebetween. Each roller is journalled in a mounting member which is pivotally supported at one end. A releasable tensioning means pulls the other ends of the mounting members toward each other thereby securing the rollers in a predetermined operational position in reference to each other. The purpose of this arrangement is that the relative position of the rollers remains unchanged during operation and that when the rollers are temporarily separated from each other for purpose of servicing and the device is then reassembled the rollers will automatically reoccupy the same relative position. However, it has been found that expansion or contraction of the tensioning means due to changes in the temperature thereof as may occur, intentionally or accidentally, during operation will affect said predetermined operational position. The present invention resides in providing temperature compensating means for controlling the operational temperature of the tensioning means so that the relative operational position of the rollers and thus the working pressure remains substantially constant.

The present invention relates to a device for granulating plastic materials such as resins and other synthetic plastic materials, and more particularly to a granulating device in which the material is granulated between a pair of coacting rollers having axially spaced parallel peripheral grooves.

The invention is specifically concerned with a device for granulating plastic material in which the grooved rollers hereinbefore referred to are supported at each end by a support structure in parallel relationship and with the grooves of the rollers staggered in reference to each other. Each of the support structures include a base part and a pair of mounting members, one for each roller. One end of each roller is journalled in one of the mounting members and the mounting members of each pair are pivotally supported with one end on said base. The releasable tensioning means is secured to both mounting members of each pair at the other end thereof and pulls the members toward each other thereby securing the rollers in a predetermined operational position in reference to each other.

A granulating device of the kind hereinabove referred to is more fully described in copending application Ser. No. 475,981, filed July 30, 1965, and now Patent 3,339,233 and assigned to the same assignee as the present application.

Granulating devices of this kind have, among others, the advantage that the relative position of the two form rollers which is set during the assembly of the device and is selected in accordance with the desired maximal working pressure is automatically restored when the device is reassembled after the rollers are temporarily separated for cleaning or other servicing, without requiring a time consuming readjustment.

It has been found that the set operational position of the rollers, that is, the spacing of the rollers remains substantially constant during operation, provided the temperature of the tensioning means remains within reasonably narrow limits. As is evident, a marked change in the temperature in either direction will cause a corresponding change in the relative operational position of the rollers due to expansion or contraction of the tensioning means in accordance with the changes in temperature experienced by the same. In actual practice, substantial changes in the temperature of the rollers of the device and with it of the tensioning means due to heat conduction will occur in practice rather frequently and unavoidably. It may be desirable to heat or cool the rollers depending upon the properties of the material to be granulated, or such changes in temperature may unintentionally occur, for instance, due to the generation of frictional heat when the material to be granulated offers strong resistance to such processing.

It is a broad object of the invention to provide a novel and improved granulating device of the general kind above referred to including temperature compensating means which permit a temperature control of the tensioning means so that the operational setting of the rollers and with it the working pressure remain substantially constant. It has been found to be advantageous to control the temperature of the tensioning means in accordance with the operational temperature of the form rollers.

As a result of the temperature compensating means according to the invention, the spacing between the form rollers as set during assembly can adapt itself to changes in the operational conditions and in particular to the changes in temperature conditions at the form rollers without varying the adjusted maximal operational pressure exerted by the rollers.

The afore pointed-out objects, features and advantages and other objects, features and advantages which will be pointed out hereinafter are obtained by providing in the tensioning means a pulling member, such as a bolt, including one or several lengthwise ducts for feeding therethrough a heating medium or cooling medium. The temperature of this medium is preferably selected as a function of the temperature of the form rollers.

In granulating devices in which the form rollers themselves are heated or cooled, the invention provides to include the duct or ducts in the bolt or in any other suitable member of the tensioning means in a medium circulation system for heating or cooling the form rollers. This had the advantage that the tension bolt automatically expands or contracts in accordance with the prevailing temperature of the form rollers thereby assuring that the spacing of the rollers and the selected maximal operational pressure produced by the rollers are maintained. As a result, the danger of damage to components of the machine is greatly reduced. Moreover, an operating pressure is maintained which assures optimal efficiency of the device.

Obviously, the configuration of the bolt or similar pulling member of the tensioning means and also the arrangement and number of the ducts for feeding the heating or cooling medium can be widely varied within the scope of the invention.

In the single figure of the accompanying drawing a preferred embodiment of the invention is shown, partly in section, by way of illustration and not by way of limitation.

To simplify the illustration and the description only the upper part of the device is shown. In this connection reference is made to the aforementioned copending prior application Ser. No. 475,981 of the assignee which shows the granulating device in its entirely.

Referring now in detail to the figure, the figure shows two mounting means 5 and 6 which should be visualized as being pivotally mounted at their lower ends in a base so that the two mounting members can be pivoted in the plane of the figure toward and away from each other as shown in the prior application. The two mounting members and the parts associated therewith which will be described hereinafter, constitute a common support structure for rotatably supporting form rollers 3 at one end thereof. The form rollers are supported in mutually parallel relationship and each form roller has in its cylindrical wall a plurality of axially spaced mutually parallel grooves. The grooves in the two rollers are so arranged that they are staggered in reference to each other. The details of the form rollers and the action thereof upon the material to be granulated are not essential for the understanding of the invention and are hence not described or illustrated in detail in the present application. One support structure as hereinbefore referred to is provided at each end of the rollers. The two rollers are pulled toward each other by releasable tensioning means hereinafter described so that the two rollers occupy a predetermined operational position in reference to each other.

The tensioning means comprises a tensioning bolt 13 which extends through eyes 12 of mounting members 5 and 6 and is retained in postion by locking members 12' of suitable design at each end. Adjustable spacers 14, 15 and 16 of conventional design are interposed between the eyes 12 to permit a convenient adjustment of the spacing between rollers 3. Bolt 13 includes a lengthwise preferably centric bore or duct 21 terminating short of one end of the bolt. A tube 22 fitted in the bore has an outer diameter which is less than the diameter of bore 21 to define an annular space about the tube and the length of the tube is such that it terminates at the right hand end just short of the end of bore 21 and that it protrudes from the left hand end of the bore. The tube is inserted into the bore from the left hand end thereof and a head member 23 having a lug 24 fitted upon the protruding tube portion in communication with the annular space.

When the device is in operation a suitable fluid the temperature of which is controlled, is fed into lug 24 in the direction of arrow A. The fluid flows along the annular space and enters near the right hand end of the bore into the open end of tube 22. It then flows through the tube in opposition to the flow through the annular space and is discharged from the bolt in the direction of arrow B.

As a result, bolt 13 is brought to the temperature of the fluid which may be either as a heating fluid or as a cooling fluid, and as a result the bolt will either expand or contract in accordance with its temperature.

Since mounting members 5 and 6 are pivotally supported, as previously described, the temperature of the bolt controls in effect the spacing and thus the working pressure of the form rollers.

If desired, the working pressure can be maintained within a predetermined range by correspondingly controlling the temperature of the fluid fed into the bolt.

Lug 24 and thus tube 22 can if desired be included in a fluid circulation system which is provided to bring the form rollers themselves to a selected temperature. However, if preferred, a separate fluid circulation system can be provided for tension bolt 13 if a separate and independent control of the temperature of bolt 13 is desired.

To effect a temperature control of form rollers 3, ducts 25 are provided in the same through which a temperature controlled fluid is guided.

It is further advantageous and within the scope of the invention to encase bolt 13 in a layer 26 of a suitable insulation material to reduce temperature variations of the bolt to a minimum.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for granulating plastic material comprising in combination:
    (a) a pair of rotary coacting form rollers having axially spaced mutually parallel peripheral grooves and mounted parallel to each other with said grooves staggered in reference to each other;
    (b) a common support structure at each end of said rollers;
    (c) each of said support structures including a pair of mounting members for each roller, each of said mounting members being pivotally mounted at one end and having journalled therein one end of the respective roller;
    (d) a releasable tensioning means secured to both mounting members of each pair at the other end thereof for pulling said members toward each other to secure said rollers in a predetermined operational position relative to each other; and
    (e) a temperature compensating means for maintaining said tensioning means at a selected temperature to compensate for changes in the relative position of said rollers due to changes in the operational temperature of the tensioning means.

2. A granulating device according to claim 1, wherein said tensioning means comprises a tension bolt and releasable fastening means for said bolt on said other ends of the mounting members, and wherein said compensating means include at least one lengthwise duct in said bolt for selectively feeding a heating medium or a cooling medium into said duct.

3. A granulating device according to claim 2, wherein said form rollers include ducts for selectively feeding a heating medium and a cooling medium therethrough, said ducts in the form rollers being connected in a common circulation system with the duct in said bolt.

4. A granulating device according to claim 2, wherein said tensioning means comprises a tension bolt and releasable fastening means for said bolt on said other ends of the mounting members, said duct in the bolt being included in a circulation system the temperature in which is controllable independently of the temperature of said form rollers.

5. A granulating device according to claim 1, wherein said bolt is made of a material having a selected temperature coefficient.

6. A granulating device according to claim 1, wherein said tensioning means comprises a tension bolt and releaseable fastening means for said bolt on said other ends of the mounting members, and wherein said bolt is encased in a layer of heat insulating material.

7. A granulating device according to claim 1, wherein said tensioning means comprises a tension bolt including a bore terminating short of one end of the bolt, releaseable fastening means for said bolt at said other ends of the mounting members, a tube fitted in said bore coaxially therewith, said tube terminating short of the closed end of the bolt and having an outer diameter less than the diameter of the bore to define an annular space between the tube and the inner bore defining wall of the bolt, and means for feeding fluid into said annular space and discharging said fluid from the tube in counter flow to the fluid flow through the annular space.

References Cited

UNITED STATES PATENTS 3,261,893  7/1966  George et al.
3,339,233  9/1967  Wortzel et al.

WILLIAM J. STEPHENSON, *Primary Examiner.*

U.S. Cl. X.R.

241—67